(12) United States Patent
Ortmann et al.

(10) Patent No.: US 10,179,582 B2
(45) Date of Patent: Jan. 15, 2019

(54) MODULAR HYBRID TRANSMISSION WITH A ONE WAY CLUTCH

(71) Applicant: Ford Global Technologies, LLC, Dearborn, MI (US)

(72) Inventors: Walter Joseph Ortmann, Saline, MI (US); Daniel Scott Colvin, Farmington Hills, MI (US); Bernard D. Nefcy, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 645 days.

(21) Appl. No.: 14/825,227

(22) Filed: Aug. 13, 2015

(65) Prior Publication Data

US 2015/0343890 A1 Dec. 3, 2015

Related U.S. Application Data

(62) Division of application No. 13/465,349, filed on May 7, 2012, now abandoned.

(51) Int. Cl.
| | |
|---|---|
| *B60K 6/365* | (2007.10) |
| *B60W 20/40* | (2016.01) |
| *B60W 10/06* | (2006.01) |
| *B60K 6/383* | (2007.10) |
| *B60K 6/48* | (2007.10) |
| *B60W 10/02* | (2006.01) |

(52) U.S. Cl.
CPC ............. *B60W 20/40* (2013.01); *B60K 6/383* (2013.01); *B60K 6/48* (2013.01); *B60W 10/02* (2013.01); *B60W 10/06* (2013.01); *B60K 2006/4825* (2013.01); *B60W 2510/0638* (2013.01); *B60W 2510/081* (2013.01); *B60W 2710/02* (2013.01); *Y02T 10/6221* (2013.01); *Y02T 10/6252* (2013.01); *Y10S 903/913* (2013.01); *Y10T 477/26* (2015.01)

(58) Field of Classification Search
CPC .............................. B60K 6/365; F16H 3/006
See application file for complete search history.

(56) References Cited

U.S. PATENT DOCUMENTS

| | | | |
|---|---|---|---|
| 7,743,678 | B2 | 6/2010 | Wittkopp et al. |
| 7,896,114 | B2 | 3/2011 | Colvin et al. |
| 2008/0185253 | A1 | 8/2008 | Kimes |
| 2008/0189018 | A1 | 8/2008 | Lang et al. |
| 2008/0264706 | A1 | 10/2008 | Andersson |

(Continued)

FOREIGN PATENT DOCUMENTS

| | | |
|---|---|---|
| CN | 101448665 A | 6/2009 |
| DE | 102005039929 A1 | 3/2007 |

*Primary Examiner* — Derek D Knight
(74) *Attorney, Agent, or Firm* — David B. Kelley; Brooks Kushman P.C.

(57) ABSTRACT

A vehicle transmission system having a combustion engine, an electric motor and a transmission includes a first clutch operatively connected between the engine and the motor and a one way clutch. The one way clutch is connected in parallel with the first clutch that permits the engine to increase speed with the clutch disengaged until the engine speed matches the motor speed. The engine provides positive torque through the one way clutch to the motor and transmission upon matching the motor speed. The first clutch and the one way clutch may be a hybrid rocker one way clutch.

11 Claims, 2 Drawing Sheets

(56) References Cited

U.S. PATENT DOCUMENTS

| | | |
|---|---|---|
| 2009/0194381 A1 | 8/2009 | Samie et al. |
| 2010/0087290 A1* | 4/2010 | Schoenek ............... B60K 6/383 |
| | | 477/5 |
| 2011/0061954 A1 | 3/2011 | Singh et al. |
| 2011/0118915 A1 | 5/2011 | Ortmann et al. |
| 2012/0203403 A1* | 8/2012 | Lee ........................ B60K 6/383 |
| | | 701/22 |

* cited by examiner

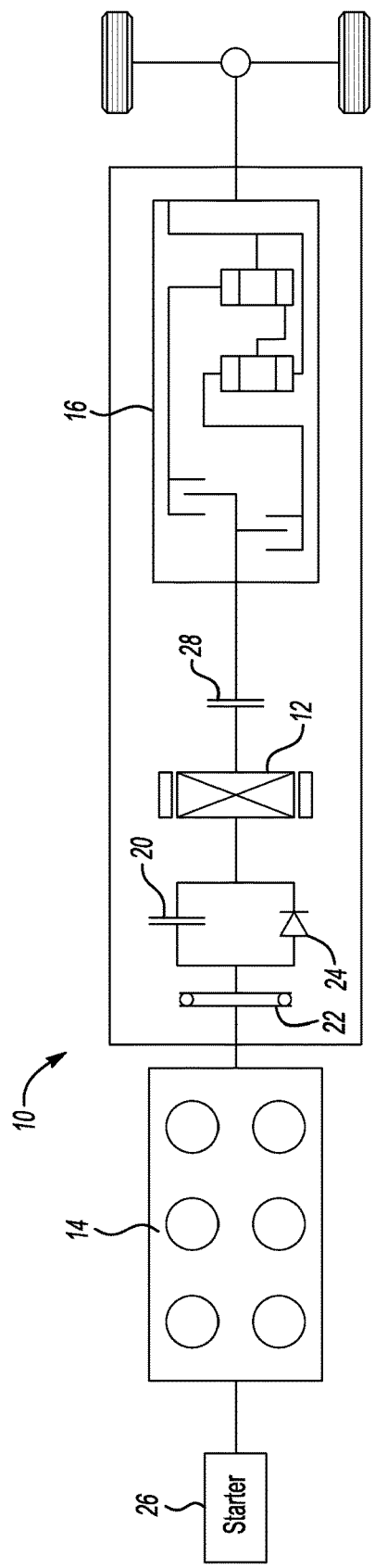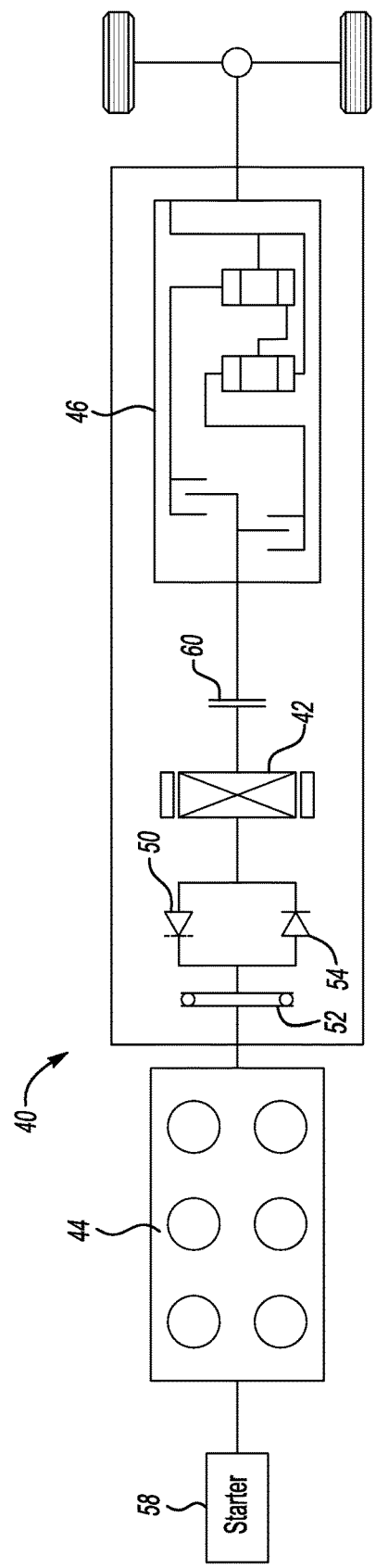

MODULAR HYBRID TRANSMISSION WITH A ONE WAY CLUTCH

CROSS-REFERENCE TO RELATED APPLICATIONS

This application is a division of U.S. application Ser. No. 13/465,349 filed May 7, 2012, now abandoned, the disclosure of which is hereby incorporated in its entirety by reference herein.

TECHNICAL FIELD

This disclosure relates to a transmission for a vehicle that has a combustion engine that is connected by a one way clutch to an electric motor and a transmission gear box.

BACKGROUND

Hybrid electric vehicles may connect a combination of an internal combustion engine with an electric motor in series to provide the power needed to propel a vehicle for improved fuel economy over a conventional vehicle. One way to improve the fuel economy of a hybrid vehicle is to shut down the engine during times that the engine operates inefficiently and to use the electric motor to provide all of the power needed to propel the vehicle. The engine must start in a quick and smooth manner that is nearly transparent to the driver in the event the driver wants more power than the electric motor can provide or if the battery becomes depleted.

A Modular Hybrid Transmission (MHT) is a pre-transmission parallel hybrid with a disconnect clutch positioned between the electric motor and the engine. The disconnect clutch is fully integrated into the transmission hydraulic system and is actuated by a linear solenoid. MHT hybrids represent one approach to providing a torque path for rear wheel drive vehicles.

In a MHT system, the engine may be started independently of the motor that is driving the vehicle. Once the engine is up to speed, the disconnect clutch may be commanded to engage to allow the engine to deliver torque to the transmission. The motor speed may be below a minimum speed required to deliver robust line pressure before the engine start request. If the line pressure is insufficient, application of the disconnect clutch may become unpredictable.

Timing the application of the disconnect clutch is important with a MHT design. The clutch is a wet friction clutch that must be stroked before torque can be transmitted. The added flow volume for stroking the clutch with the oil pump operating at low speed may cause an undesired drop in line pressure that may create a driveline disturbance. The drop in line pressure may have a deleterious effect on controlling the pressure applied by the launch clutch or torque converter bypass clutch.

The above problems and other problems relating to modular hybrid systems are addressed by this disclosure as summarized below.

SUMMARY

In the MHT design, the engine is never required to operate at a higher speed than the motor. When the engine is off, the motor may operate at a higher speed than the engine. A one way clutch (OWC) may be provided that is connected between the engine and the motor in parallel with a disconnect clutch. The one way clutch prevents the engine from over-running the motor. The one way clutch eliminates the need to synchronously transfer torque from the motor to the engine as the engine increases speed. This one way clutch simplifies the process of applying the clutch.

Alternatively, the friction clutch may be eliminated and a hybrid rocker one way clutch (HROWC) may be placed in series with the OWC. The HROWC is an electrically controlled device that is shifted between "applied" and "not applied" states. The rockers are open and torque is not transmitted in either direction when the HROWC is not applied. When the HROWC is applied, the rockers are pulled in to allow slip in one direction and full engagement in the other direction. The HROWC is applied when the engine speed matches motor speed so that the engine is locked with the motor by the two OWCs. When the HROWC is not applied, the engine is allowed to operate at speeds less than the motor. One advantage of this concept is lower spin losses of the open clutch during electric drive.

According to one aspect of this disclosure, a transmission system is provided for a vehicle that has a combustion engine, an electric motor and a transmission connected in series. The transmission system comprises a disconnect clutch operatively connected between the engine and the motor, and a one way clutch connected in parallel with the disconnect clutch that allows the engine to increase speed with the disconnect clutch disengaged until it matches the motor speed. After matching speeds, the engine provides positive torque to the motor and transmission.

According to other aspects of the disclosure, the disconnect clutch may be a wet clutch that is shifted by hydraulic pressure from a hydraulic pump. The one way clutch connects the engine to the transmission to transmit torque to a driveline of the vehicle when the engine speed matches the motor speed. The speed of rotation of the engine is limited by the OWC to the motor speed. The one way clutch may be a hybrid one way clutch that has rockers that may be shifted to engage the clutch in one rotational direction.

According to another aspect of the disclosure, a transmission system is disclosed for a vehicle that has a combustion engine, an electric motor and a transmission connected in series. The transmission system comprises a one way clutch that slips in a first rotational drive direction, and a hybrid one way clutch having selectively shifted rockers. The hybrid clutch is connected in parallel to the one way clutch between the engine and the motor. The rockers are actuated when the engine speed matches the motor speed to shift the rockers from a bidirectional slip condition to a one way slip condition locked in the first rotational drive direction.

According to further aspects of the disclosure, the rockers when actuated may cause the hybrid clutch to slip in a second rotational drive direction. The one way clutch connects the engine to the transmission to transmit torque to a driveline of the vehicle when the engine speed matches the motor speed.

According to another aspect of the disclosure as it relates to a method of operating a transmission system for a vehicle that has a combustion engine, an electric motor and a transmission connected in series. The transmission system further includes a first clutch operatively connected between the engine and the motor and a one way clutch connected in parallel with the first clutch. The method includes the steps of initiating an engine start operation, disengaging the first clutch to disconnect the engine from the electric motor, and engaging the one way clutch when the engine speed matches or exceeds the motor speed.

According to other aspects of the method, the first clutch may be a hybrid one way clutch having rockers that are selectively shifted to connect the engine to the electric motor. The first clutch may be a hydraulically actuated disconnect clutch. The method may further comprise applying the maximum pressure to the first clutch.

The above aspects of the disclosure and other aspects will be better understood in view of the attached drawings and the following detailed description of the illustrated embodiments.

BRIEF DESCRIPTION OF THE DRAWINGS

FIG. 1 is a diagrammatic representation of a modular hybrid transmission with a one way clutch connected in parallel with a disconnect clutch;

FIG. 3 is a diagrammatic representation of an alternative embodiment of a modular hybrid transmission with a one way clutch or a hybrid rocker one way clutch connected in parallel with an oppositely oriented hybrid rocker one way clutch.

DETAILED DESCRIPTION

Figure 2:
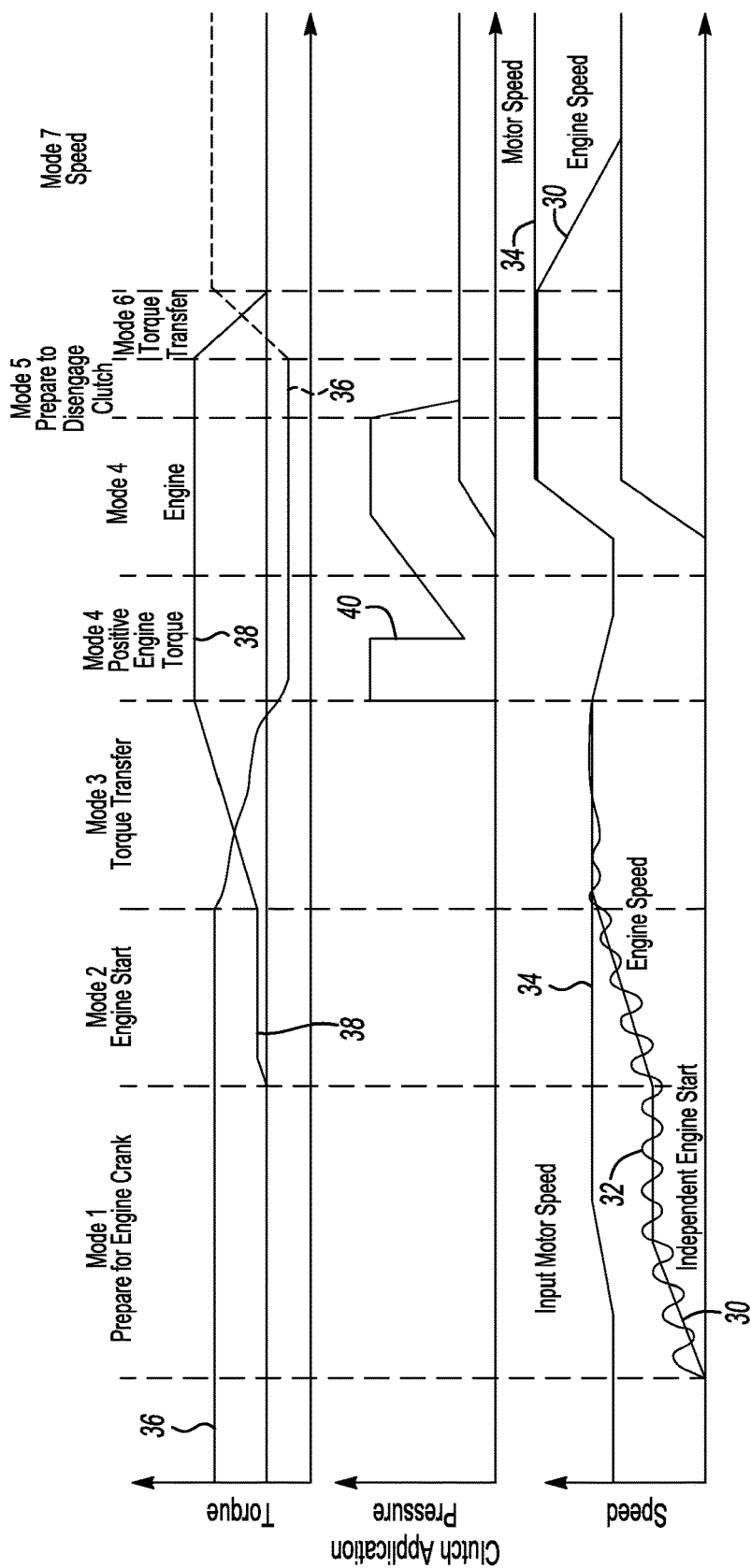
FIG. 2 is a graph of an engine start control showing engine and motor speed and engine and motor torque through seven modes of operation.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIG. 1, a modular hybrid transmission (MHT) system 10 is diagrammatically illustrated and includes an electric traction motor 12, a combustion engine 14, and a transmission gear box 16. A disconnect clutch 20 is operatively disposed between the engine 14 and the motor 12 to selectively connect and disconnect the engine 14 from the motor 12. A damper 22 may also be provided between the disconnect clutch 20 and the engine 14. A one way clutch (OWC) 24 is connected in parallel with the disconnect clutch 20 between the damper 22 and the electric motor 12.

A starter motor 26 may be provided for starting the engine 14 in the embodiment shown in FIG. 1. It should be understood that other starter arrangements may be provided that may benefit from the concepts disclosed.

A launch clutch 28 is provided between the motor 12 and the transmission gearbox 16. The launch clutch 28 provides torque to the transmission gear box 16 from either or both of the motor 12 or engine 14. In the embodiment of FIG. 1, no torque converter is included in the gearbox. A torque converter could be included in the combination and used in place of the launch clutch 28.

Referring to FIG. 2, a graph of engine and motor torque and engine and motor speed during engine start and engine shut down is provided for a transmission system 10 made in accordance with one embodiment of this disclosure. In mode 1, the motor 12 is providing torque for traction and the engine 14 is not in operation. The vehicle in mode 1 is preparing to start the engine 14 that is indicated by the line 30 that shows the engine speed increasing. The oscillating line 32 overlaid on line 30 indicates that the rate of increase varies. The speed of the motor is illustrated by line 34 and is generally unchanged except that the motor speed may increase a small amount during engine start because of the need to maintain fluid pressure in the system or to allow a downstream clutch to slip and provide torsional isolation relative to the driveline.

Torque from the motor 12 is illustrated by line 36 that shows positive torque is provided by the motor 12 through the first mode. Engine torque illustrated by line 38 in mode 1 is at zero. As the engine speed 30 increases speed, and enters mode 2 a small amount of torque is produced by the engine 14. In mode 3, the engine speed continues to increase and approaches the same speed as the motor 12 as shown on line 34. When the engine speed matches the motor speed, mode 3 begins in which torque transfer from the engine 14 begins while torque from the motor 12 is reduced. As used in this disclosure, the term "matches" should be understood to mean that the speed of rotation of the engine 14 is within 5 rpm compared to the motor 12. In mode 3, the engine speed 30 is shown to match the motor speed 34 and motor torque 36 is reduced while the engine torque 38 increases.

Line 40 illustrates operation of the disconnect clutch 20. In mode 4 the disconnect clutch 20 is beginning to be applied. However, it should be understood that the disconnect clutch 20 could be applied earlier in mode 3. The disconnect clutch 20 is applied to lock-up the motor 12 and engine 14. The engine 14 in mode 4 provides positive torque to drive the vehicle and also produces torque that is used to charge the battery (not shown).

In mode 4 with the vehicle being powered by the combustion engine 14 pressure applied to the disconnect clutch 20 is shown by line 40 to be initially at a normal operational level. The pressure command is reduced to zero when the disconnect clutch is released to disconnect the engine 14 from the motor 12. In mode 5, the vehicle is preparing to transfer from the engine 14 as a source of torque to the motor 12 as a source of torque. In mode 6, the engine speed and motor speed are matched to within 5 rpm. Motor torque 36 and engine torque 38 remain relatively constant through modes 4 and 5. However, during mode 6 the source of torque is transferred from the engine 14 to the motor 12. At the end of mode 6, the engine speed begins to be reduced until the engine 14 stops.

Referring to FIG. 3, an alternative embodiment having two variations is shown. The alternative embodiment of the modular hybrid transmission (MHT) system 40 includes an electric traction motor 42, a combustion engine 44, and a transmission gear box 46. A hybrid rocker one way clutch 50 is operatively connected between the engine 44 and the motor 42 that is adapted to connect and disconnect the engine 44 from the motor 42. The hybrid rocker one way clutch 50 is bi-directionally rotatable and is lockable in one rotational direction by shifting the rocker, as is known in the art. A damper 52 may also be provided between the hybrid rocker one way clutch 50 and the engine 44.

In one variation, a one way clutch (OWC) 54 is connected in parallel with the hybrid rocker one way clutch 50. Alternatively, a second hybrid rocker one way clutch could be incorporated in place of the OWC 54. One advantage of using a hybrid rocker one way clutch 50 instead of the OWC 54 is that there is less parasitic power loss than with a friction clutch type of OWC and can improve fuel economy. The hybrid rocker one way clutch 54 includes a coil (not shown) that requires energy to shift the rocker and may be more expensive than a conventional OWC. However the hybrid rocker one way clutch 54 is expected to improve performance in terms of improved noise vibration and harshness. The hybrid rocker one way clutches 50 and 54 do not require additional hydraulic control and do not include friction clutch elements.

A starter motor 58 may be provided for starting the engine 44 in the embodiment shown 1 in FIG. 3. It should be understood that other starter arrangements may be provided that may benefit from the concepts disclosed.

A launch clutch 60 is provided between the motor 42 and the transmission gearbox 46. The launch clutch 60 provides torque to the transmission gear box 46 from either or both of the motor 42 or engine 44. In the embodiment of FIG. 3, no torque converter is included in the gearbox. A torque converter could be included in the combination and used in place of the launch clutch 60.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A transmission system comprising:
   a hybrid one-way clutch having selectively shifted rockers;
   a one-way clutch connected in parallel to the hybrid one-way clutch between an engine and a motor; and
   means for actuating the rockers are actuated when an engine speed matches a motor speed to shift the rockers from a bidirectional slip condition to a one-way slip condition locked in a first rotational drive direction.

2. The transmission system of claim 1 wherein the rockers of the hybrid one-way clutch when actuated causes the hybrid clutch to slip in a second rotational drive direction.

3. The transmission system of claim 1 wherein when the engine speed matches the motor speed, the one-way clutch connects the engine to the transmission to transmit torque to a driveline of the vehicle.

4. The transmission system of claim 1 wherein the one-way clutch is a second hybrid one-way clutch that locks prior to when the engine speed matches the motor speed.

5. A method of operating a transmission system for a vehicle that has a combustion engine, an electric motor, and a transmission connected in series, a hybrid one-way clutch having rockers that are selectively shifted to connect the engine and the motor, and a one-way clutch connected in parallel with the hybrid one-way clutch, the method comprising:
   initiating an engine start operation;
   disengaging the hybrid one-way clutch to disconnect the engine from the electric motor; and
   engaging the one-way clutch when an engine speed matches a motor speed.

6. The method of claim 5 wherein the hybrid one-way clutch includes electrically shifted rockers.

7. The method of claim 6 wherein the one-way clutch is a second hybrid one-way clutch includes electrically shifted rockers.

8. The method of claim 5 wherein the one-way clutch is a hybrid one-way clutch includes electrically shifted rockers.

9. A vehicle transmission system having a combustion engine, an electric motor and a transmission, the system comprising:
   a first hybrid one-way clutch engaged in a first rotational direction;
   a second hybrid one-way clutch connected in parallel to the first hybrid one-way clutch that permits the engine to increase speed with the second hybrid one-way clutch disengaged until matching a motor speed; and
   means for providing positive torque from the engine through the first one-way clutch to the motor and transmission upon matching an engine speed to the motor speed.

10. The transmission system of claim 9, wherein the first hybrid one-way clutch includes rockers that may be shifted to engage the first hybrid one-way clutch in the first rotational direction.

11. The transmission system of claim 10, wherein the second hybrid one-way clutch has rockers that may be shifted to engage the second hybrid one-way clutch in the second rotational direction.

* * * * *